(12) United States Patent
Lee et al.

(10) Patent No.: US 10,136,139 B2
(45) Date of Patent: Nov. 20, 2018

(54) DISPLAY DRIVER AND METHOD OF OPERATING IMAGE DATA PROCESSING DEVICE

(71) Applicants: Maeum Lee, Seoul (KR); Deoksoo Park, Hwaseong-si (KR); Miaofeng Wang, Suwon-si (KR); Unki Park, Hwaseong-si (KR); Ho Joon Chung, Seoul (KR)

(72) Inventors: Maeum Lee, Seoul (KR); Deoksoo Park, Hwaseong-si (KR); Miaofeng Wang, Suwon-si (KR); Unki Park, Hwaseong-si (KR); Ho Joon Chung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 927 days.

(21) Appl. No.: 14/325,900

(22) Filed: Jul. 8, 2014

(65) Prior Publication Data

US 2015/0195581 A1 Jul. 9, 2015

(30) Foreign Application Priority Data

Jan. 3, 2014 (KR) ........................ 10-2014-0000881

(51) Int. Cl.
| | | |
|---|---|---|
| H04N 19/89 | (2014.01) |
| H04N 19/176 | (2014.01) |
| H04N 19/11 | (2014.01) |
| H04N 19/154 | (2014.01) |
| H04N 19/194 | (2014.01) |
| H04N 19/196 | (2014.01) |
| H04N 19/19 | (2014.01) |

(Continued)

(52) U.S. Cl.
CPC .......... *H04N 19/176* (2014.11); *H04N 19/11* (2014.11); *H04N 19/154* (2014.11);
(Continued)

(58) Field of Classification Search
CPC .... H04N 19/176; H04N 19/11; H04N 19/154; H04N 19/194; H04N 19/19; H04N 19/196
(Continued)

(56) References Cited

U.S. PATENT DOCUMENTS

| | | |
|---|---|---|
| 8,126,282 B2 | 2/2012 | Jung et al. |
| 8,472,516 B2 | 6/2013 | Tong et al. |

(Continued)

FOREIGN PATENT DOCUMENTS

| | | |
|---|---|---|
| JP | 2007181051 A | 7/2007 |
| JP | 400157 B2 | 8/2007 |

(Continued)

*Primary Examiner* — Anand S Rao
*Assistant Examiner* — Joseph W Becker
(74) *Attorney, Agent, or Firm* — Harness, Dickey & Pierce, P.L.C.

(57) ABSTRACT

A display driving device includes an encoding unit and a frame memory. The encoding unit is configured to generate final mode information and a compressed bit stream based on a macro block and a first reference pixel, and generate a final bit stream using the final mode information and the compressed bit stream. The frame memory is configured to store and provide the stored final bit stream to a decoding unit. The final mode information includes mode information and a reconstruction reference value. The mode information indicates a selected mode from a plurality of modes, each of the plurality of modes indicating selection pixels and non-selection pixels in the macro block. The selection pixels are pixels in the macro block selected for undergoing a compression operation, the non-selection pixels are pixels not selected for undergoing the compression operation, and the reconstruction reference value indicates encoding information for the non-selection pixels.

17 Claims, 16 Drawing Sheets

(52) U.S. Cl.
CPC ........... *H04N 19/194* (2014.11); *H04N 19/19* (2014.11); *H04N 19/196* (2014.11)

(58) Field of Classification Search
USPC ..................................................... 375/240.01
See application file for complete search history.

(56) References Cited

U.S. PATENT DOCUMENTS

| | | |
|---|---|---|
| 2006/0268982 A1 | 11/2006 | Lee et al. |
| 2008/0317116 A1* | 12/2008 | Lee .......................... G06T 9/00 375/240.01 |
| 2012/0294365 A1 | 11/2012 | Zheng et al. |
| 2013/0016780 A1 | 1/2013 | Oh |
| 2013/0044814 A1* | 2/2013 | Guo ..................... H04N 19/105 375/240.12 |

FOREIGN PATENT DOCUMENTS

| | | |
|---|---|---|
| JP | 20072015377 A | 8/2007 |
| JP | 2012147268 A | 8/2012 |
| KR | 100837410 B1 | 6/2008 |
| KR | 20080048262 A | 6/2008 |
| KR | 20130049707 A | 5/2013 |

\* cited by examiner

| P0 | P1 | P2 | P3 |
|----|----|----|----|
| P4 | P5 | P6 | P7 |

Marco Block

Mode=0000

Mode=0001

Mode=0010

Mode=0011

Mode=0100

Mode=0101

Mode=0110

Mode=0111

Mode=1000

Mode=1001

Mode=1010

Mode=1011

Mode=1100

Mode=1101

Mode=1110

Mode=1111

FIG. 20

| Non-selection Pixels | possible reference value | | | | | | | |
|---|---|---|---|---|---|---|---|---|
| P0 | REF0 | REF1 | REF2 | P4' | P5' | P6' | (REF0+P5')/2 | (REF1+P6')/2 |
| P1 | REF1 | REF2 | REF3 | P4' | P5' | P6' | (REF1+P6')/2 | (REF3+P4')/2 |
| P2 | REF2 | REF3 | REF4 | P5' | P6' | P7' | (REF2+P7')/2 | (REF4+P5')/2 |
| P3 | REF3 | REF4 | REF5 | P5' | P6' | P7' | (REF4+P7')/2 | (REF5+P6')/2 |
| Encoded bit | 000 | 001 | 010 | 011 | 100 | 101 | 110 | 111 |

DISPLAY DRIVER AND METHOD OF OPERATING IMAGE DATA PROCESSING DEVICE

CROSS-REFERENCE TO RELATED APPLICATION

This U.S. Non-provisional application claims priority under 35 USC § 119 to Korean Patent Application 10-2014-0000881, filed on Jan. 3, 2014, in the Korean Intellectual Property Office (KIPO), the disclosure of which is incorporated by reference in its entirety herein.

BACKGROUND

1. Technical Field

The inventive concepts relate to an image data processing scheme, and more particularly, to a display driver, which may comprise memory, and/or a method for operating an image data processing device.

2. Discussion of the Related Art

The requirement regarding to high resolution and high quality image such as UHD (Ultra High Definition) image and image of portable device such as smart phone and tablet personal computer (PCs) is increasing. As the image data or image information is high resolution and high quality, the data quantity relatively increases compared to conventional image data, and the cost to transmit or store image data also increases. The image processing scheme to resolve the problems when image data becomes high resolution and high quality is desired.

There have been developed flat panel display devices with less weight and volume than conventional cathode ray tube (CRT) displays and monitors. Such flat panel display devices may include plasma display panel (PDP) devices, liquid crystal display (LCD) devices, field emission display devices, organic light emitting display devices, and the like. The flat panel display device may include a panel to display an image and a display driver integrated circuit (or display driving circuit). Display driving circuits may receive image information from a host, such as graphic card. Display driving circuits convert image information into image data to be provided to the flat panel display.

With increases in the resolution of flat panel display devices, the memory usage of display driving circuits is increased. The increase in memory usage gives rise to a memory size increase of the display driving circuit. The memory size increase gives rise to a size increase of the display driving circuit and brings down the competitive strength of products by giving negative effect on the unit cost of product and product yield. Also, with increases in the resolution, the amount of image data transmitted from host to the display driving circuit increases. Such increases in the amount of image data gives rise to real time image data transmitting delay of high resolution image data.

SUMMARY

According to some of the various aspects of the present inventive concepts, provided is an application processor to transmit compressed image data in order to reduce power consumption, a display driver to decompress the compressed image data, and/or a system which may process the image data and include the application processor and the display driver.

According to some of the various aspects of the present inventive concepts, provided is an application processor to transmit compressed image data for reducing data bandwidth, a display driver to decompress the compressed image data, and/or an image processing system including the application processor and the display driver.

According to some of the various aspects of the present inventive concepts, provided is an image processing system which may include a display driver to store the compressed image data reducing the amount of the frame memory used, and decompress the compressed image data.

In one embodiment, a display driving device includes an encoding unit configured to generate a final mode information based on a macro block and at least one reference pixel. The encoding unit is configured to generate a compressed bit stream based on the macro block, and to generate a final bit stream using the final mode information and the compressed bit stream. A frame memory is configured to store the final bit stream and to provide the stored final bit stream to a decoding unit. The final mode information includes mode information and a reconstruction reference value. The mode information indicates a selected mode from a plurality of modes, each of the plurality of modes indicating selection pixels and non-selection pixels in the macro block. The selection pixels are pixels in the macro block selected for undergoing a compression operation, the non-selection pixels are pixels not selected for undergoing the compression operation, and the reconstruction reference value indicates encoding information for the non-selection pixels.

The encoding unit comprising: a first encoder configured to generate the final mode information based on the macro block, a first reference pixel, and a second reference pixel; a second encoder configured to generate the compressed bit stream based on the final mod information; and a bit stream generator configured to generate the final bit stream using the final mode information and the compressed bit stream.

The reconstructor is configured to reconstruct a pixel from a previous final bit stream as the first reference pixel, and the reconstructor is configured to reconstruct a compressed selection pixel as the second reference pixel.

The first encoder comprising: a difference calculation unit configured to calculate, for each of the plurality of modes, a plurality of difference values including a first difference value and a second difference value, the first difference value being a difference between one of the non-selection pixels and the first reference pixel, and the second difference value being a difference between the non-selection pixel and an average value of the first reference pixel and second reference pixel.

The first encoder further comprising: a candidate prediction unit configured to determine, for each of the plurality of modes, a minimum one of the plurality of difference values associated with each of the non-selection pixels and to determine a sum of the determined minimum difference values as a mode error; and a mode selection unit configured to generate the final mode information based on the each of mode errors for the plurality of modes.

The sum is one of SAD (sum of absolute differences), SSD (sum of squared differences), MAD (mean absolute difference), or NCC (normalized cross-correlation).

The second encoder is configured to generate the compressed bit, stream by compressing the selection pixels based on the final mode information.

The final bit stream is configured to comprise the mode information, the reconstruction reference value and the compressed bit stream.

The decoding unit comprises: a first decoder configured to generate the compressed bit stream and decoded final mode information by parsing the final bit stream; a second decoder configured to generate the selection pixel information using the compressed bit stream; and a reconstruction unit configured to generate a decoded macro block based on the selection pixel information and the decoded final mode information.

The first decoder comprises: a bit stream unpacker configured to parse the final bit stream into the compressed bit stream, a header and the reconstruction reference value; and a mode decoding unit configured to generate decoded final mode information based on the header and the reconstruction reference value.

The reconstruction unit is configured to reconstruct the selection pixel from the selection pixels information and to reconstruct the non-selection pixels from the final mode information.

In another embodiment, a host providing image compressed data to a display driving chip including a frame memory comprises: an encoding unit configured to generate a final mode information based on a macro block and at least one reference pixel the encoding unit configured to generate a compressed bit stream based on the macro block, and the encoding unit configured to generate a final bit stream using the final mode information and the compressed bit stream; wherein the final mode information includes mode information and a reconstruction reference value, the mode information indicating a selected mode from a plurality of modes, each of the plurality of modes indicating selection pixels and non-selection pixels in the macro block, the selection pixels being pixels in the macro block selected for undergoing a compression operation, the non-selection pixels being pixels not selected for undergoing the compression operation, and the reconstruction reference value indicating encoding information for the non-selection pixels.

The encoding unit comprises: a first encoder configured to generate the final mode information based on the macro block, a first reference pixel, and a second reference pixel; a second encoder configured to generate the compressed bit stream based on the final mode information; and a bit stream generator configured to generate the final bit stream using the final mode information and the compressed bit stream.

The reconstructor is configured to reconstruct a pixel from a previous final bit stream as the first reference pixel, and the reconstructor is configured to reconstruct a compressed selection pixel as the second reference pixel.

The first encoder comprises: a difference calculation unit configured to calculate for each of the plurality of modes, a plurality of difference values including a first difference value and a second difference value, the first difference value being a difference between the one of non-selection pixels and the first reference pixel, and the second difference value being a difference between the non-selection pixel and an average value of the first reference pixel and the second reference pixel.

The first encoder further comprises: a candidate prediction unit configured to determine, for each of the plurality of modes, a minimum one of the plurality of difference values associated with each of the non-selection pixels and to determine a sum of the determined minimum difference values as a mode error; and a mode selection unit configured to generate the final mode information based on the mode errors for the plurality of modes.

The sum is one of SAD (sum of absolute differences), SSD (sum of squared differences), MAD (mean absolute difference), or NCC (normalized cross-correlation).

The second encoder is configured to generate the compressed bit stream by compressing the selection pixels based on the final mode information.

The final bit stream comprises the compressed bit stream, a reconstruction reference value of the non-selection pixels and a mode information of the selection pixel included in the final mode information.

In a future embodiment, a mobile device comprises: a host configured to provide image compressed data; a data bus configured to transmit the image compressed data; a display driving chip configured to comprise a frame memory to store the transmitted image compressed data; and a display device, wherein; the host comprises an encoding unit configured to generate final mode information based on a macro block and at least one reference pixel, the encoding unit is configured to generate a compressed bit stream based on the macro block, and the encoding unit configured to generate the image compressed data using the final mode information and the compressed bit stream, the display driving chip comprises a decoding unit configured to generate a decoded macro block based on the stored image compressed data, the display device is configured to display the generated decoded macro block on a panel, and the final mode information is including mode information and a reconstruction reference value, the mode information indicating a selected mode from a plurality of modes, each of the plurality of modes indicating selection pixels and non-selection pixels in the macro block, the selection pixels being pixels in the macro block selected for undergoing a compression operation, the non-selection pixels being pixels not selected for undergoing the compression operation, and the reconstruction reference value indicating encoding information for the non-selection pixels.

The encoding unit comprises: a first encoder configured to generate the final mode information based on the macro block, a first reference pixel, and a second reference pixel; a second encoder configured to generate the compressed bit stream based on the final mode information; and a bit stream generator configured to generate the image compressed data using the final mode information and the compressed bit stream.

The reconstructor is configured to reconstruct a pixel from a previous final bit stream as the first reference pixel, and the reconstructor is configured to reconstruct a compressed selection pixel as the second reference pixel.

The first encoder comprises: a difference calculation unit configured to calculate, for each of the plurality of modes, a plurality of difference values including a first difference value and a second difference value, the first difference value being a difference between one of the non-selection pixels and the first reference pixel, and the second difference value being a difference between the non-selection pixel and an average value of the first reference pixel and the second reference pixel.

The second encoder is configured to generate the compressed bit stream by compressing the selection pixels based on the final mode information.

The image compressed data comprises the reconstruction reference value and the mode information.

The decoding unit comprises: a first decoder configured to generate the compressed bit stream and decoded final mode information by parsing the image compressed data; a second decoder configured to generate the selection pixel information using the compressed bit stream; and a reconstruction unit configured to generate a decoded macro block based on the selection pixel information and the decoded final mode information.

The first decoder comprises: a bit stream unpacker configured to parse the final bit stream into the compressed bit stream, a header and the reconstruction reference value.

The reconstruction unit is configured to reconstruct the selection pixels from the selection pixel information, and to reconstruct the non-selection pixels from the final mode information.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 20 is a table illustrating possible reference values associated with corresponding non-selection pixels.

DETAILED DESCRIPTION

Figure 1:
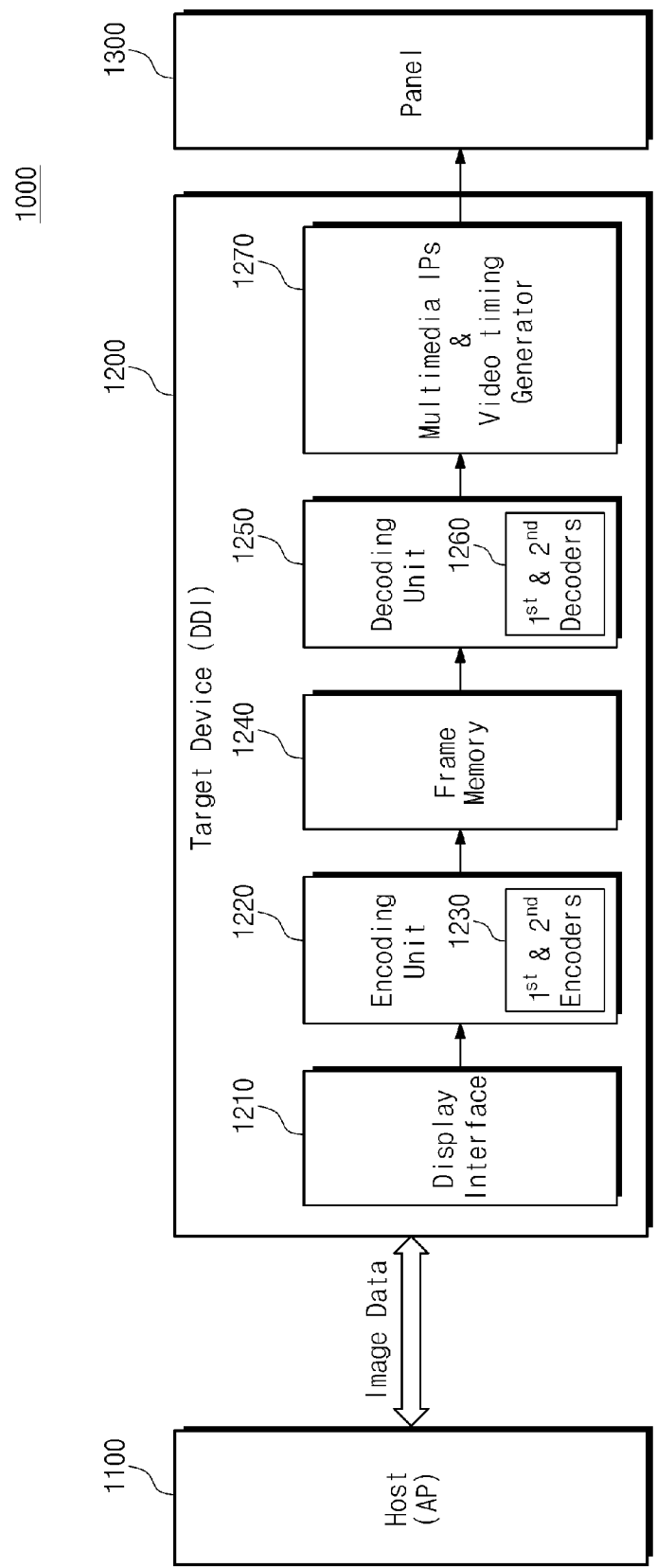
FIG. 1 is a block diagram illustrating an image data processing system according to at least one example embodiments of the inventive concepts.

Detailed example embodiments of the inventive concepts are disclosed herein. However, specific structural and functional details disclosed herein are merely representative for purposes of describing example embodiments. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I. IMAGE DATA PROCESSING SYSTEM

FIG. 1 is a block diagram illustrating an image data processing system according to at least some example embodiments of the inventive concepts. Referring to FIG. 1, an image data processing system (1000) comprises a host (1100), a target device (1200) and a panel (1300).

The host (1100) is capable of transmitting image data to the target device (1200). For example, the host (1100) may be an application processor (AP) and the target device may be a display driving integrated circuit (IC), display driving chip or display driving device. The application processor (AP) may be able to control the display driving device. The application processor may be able to transmit the image data to the display driving device through a channel. Herein, the image data may be compressed image data or non-compressed image data.

Still referring to FIG. 1 the target device (1200) may include a display interface (1210), an encoding unit (1220), a frame memory (1240), a decoding unit (1250) and a multimedia IP and video timing generator (1270). The target device may receive non-compressed images from host through display interface (1210). The encoding unit 1220 may be a processor configured to encode the image data as will be discussed in detail below. For example, the encoding processor may have an associated memory storing code that configures the processor into a special purpose machine for encoding the image data as discussed in detail below. Alternatively, the encoding unit 1220 may be an application specific processor (ASIC), or encoding circuit, configured to encode the image data as will be discussed in detail below. The decoding unit 1250 may be a processor configured to decode the encoded image data as will be discussed in detail below. For example, the decoding processor may have an associated memory storing code that configures the processor into a special purpose machine for decoding the encoded image data as discussed in detail below. Alternatively, the decoding unit 1250 may be an application specific processor (ASIC), or decoding circuit, configured to encode the image data as will be discussed in detail below. The multimedia IPs and timing generator 1270 may be a processor configured to process the decoded image data as will be discussed in detail below. For example, the processor may have an associated memory storing code that configures the processor into a special purpose machine for processing the decoded image data as discussed in detail below. Alternatively, the multimedia IPs and timing generator 1270 may be an application specific processor (ASIC), or circuit, configured to process the decoded image data as will be discussed in detail below. As will be appreciated, the encoding unit 1220, the decoding unit 1250, and/or the multimedia IPs and video timing generator 1270 may be collectively embodied in a single processor, ASIC or circuit.

The encoding unit (1220) may include a first and second encoder (1230). The encoding unit (1220) may be embodied in a compressor. The first and second encoder 1230 may perform encoding on the received non-compressed image data, and output compressed image data. The first and second encoder may determine an encoding mode, and respectively apply different encoding based on the determined mode. The encoding unit (1220) may generate compressed image data having high compressibility rate by encoding in this manner. The selection of the encoding mode, and encoding based on the selected encoding mode will be explained referring to FIGS. 5 to 10.

The frame memory (1240) may store the compressed image data output from the encoding unit (1220). Also, the frame memory (1240) may output the stored and compressed image data to the decoding unit (1250). The frame memory (1240) may be a volatile memory for example, (dynamic random access memory) DRAM or (static random access memory) SRAM or be a non-volatile memory such as FLASH memory, (phase-change random access memory) PRAM, or (magnetoresistive random access memory) MRAM.

The decoding unit (1250) may include a first and second decoder (1260). The decoding unit (1250) may be a decompression machine. The decoding unit (1250) may receive the compressed image data from the frame memory (1240) and perform decoding. The decoding unit (1250) may output decompressed image data. The first and second decoder may apply a different decoding (e.g., inverse of the different encoding by the first and second encoder 1230). The decoding will be explained referring to FIGS. 15 to 18.

The multimedia IP and video timing generator (1270) may handle and/or process the decoded image data output from the decoding unit (1250) and transmit the handled and/or process image data to panel (1300).

The panel (1300) may display an image based on the outputted image data from target device (1200). The panel (1300) may display a 2-dimensional image or a 3-dimensional structure image. The panel (1300) may be a thin film transistor-liquid crystal display (TFT-LCD), light emitting diode (LED) panel, organic LED (OLED) panel or active-matrix OLED (AMOLED) panel.

The image data processing system of FIG. 1 may include the encoding unit (1220) in the target device (1200) and compress image data using the encoding unit (1220). The target device (1200) may compress image data using at least two of the different encoding methods. As a request regarding high resolution image support of portable device increases, the image data quantity which is stored to the target device (1200) increases. As a size of the frame memory to process high resolution image data increases, the chip area of target device increases. The increasing area of the target device may give rise to production expense increases and production yield decreases when the target device is produced.

According to aspects of the inventive concepts, the target device (1200) may reduce the amount of the frame memory (1240) used and prevent the size of the frame memory (1240) from increasing by compressing the image data with high resolution. Also, as the memory use is decreased, the number and length of lines connected to the memory is decreased. This may prevent interference and voltage dropping between signals. And, this may prevent false operation by interference and voltage dropping between signals and reduce consumption of electrical power.

Figure 2:
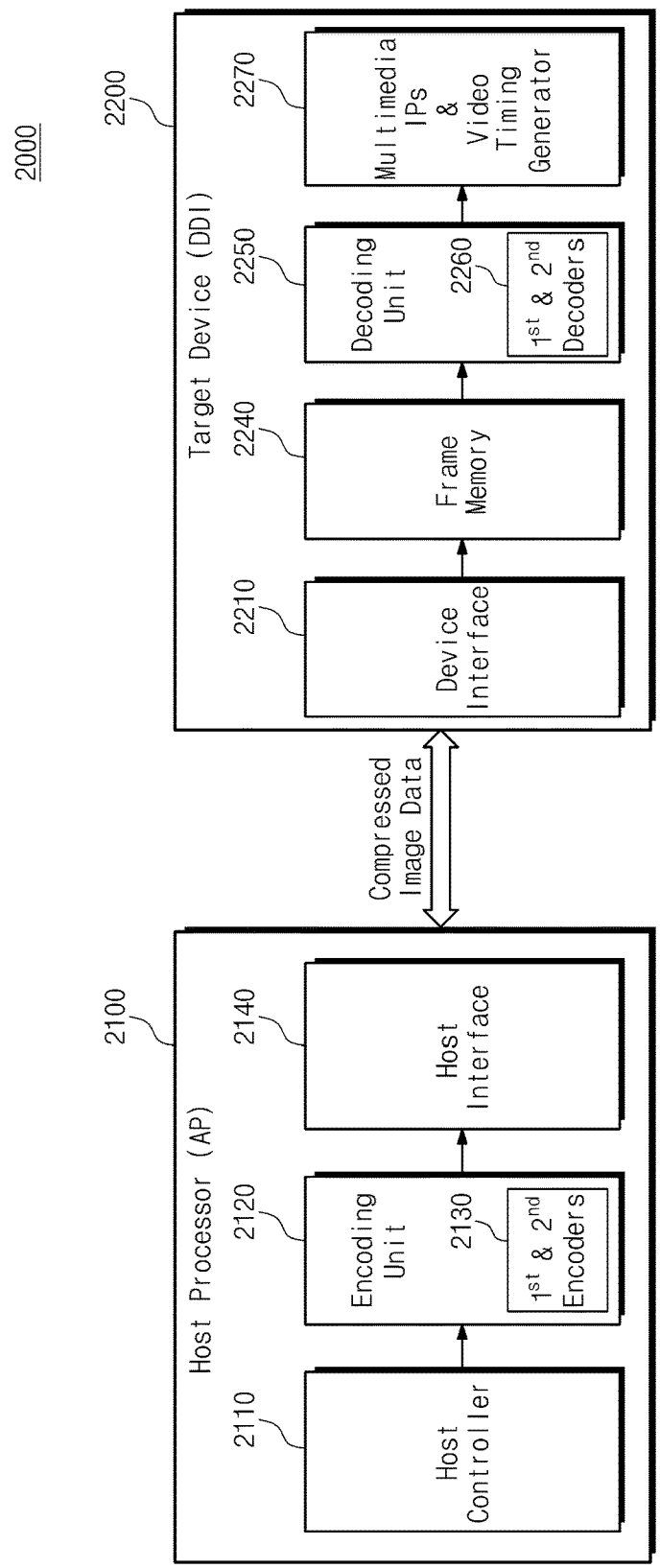
FIG. 2 is a block diagram illustrating an image data processing system according to at least some example embodiments of the inventive concepts.

FIG. 2 is a block diagram illustrating an image data processing system according to at least some example embodiments of the inventive concepts. Referring to FIG. 2, the image data processing system (2000) may include a host (2100) and a target device (2200). The host (2100) may be an application processor, and the target device (2200) may be a display driving integrated circuit (DDI).

The host (2100) may include host controller (2110), encoding unit (2120) and host interface (2140). The host controller (2100) may transmit at least one control signal to encoding unit (1220). The control signal may be for processing image data, for example, a clock signal, sync signal, or a signal relate to the sync signal. Also, the host controller (2100) may transmit the image data to encoding unit (2120).

The encoding unit (2120) may include first and second encoders (2130). The first and second encoder (2130) may encode non-compressed image data and output compressed image data. The function and operation of encoding unit (2120) in FIG. 2 is the same as that in FIG. 1, and description thereof is thus omitted.

The host interface (2140) may be embodied as a CPU interface, RGB interface, or serial interface. According to an example embodiment, the host interface (2140) may be embodied with MDDI (mobile display digital interface), MIPI® (mobile industry processor interface), SPI (serial peripheral interface), I2C (inter IC) interface, interface to support DP (displayport), interface to support eDP (embedded displayport), or HDMI.

Host interface (2140) may transmit the compressed image data output from the encoding unit (2120) to the target device (2200). Because the host (2100) transmits compressed image data to target device (2200), the quantity of data to transmit from the host (2100) to the target device (2200) may decrease.

Continuing to refer to FIG. 2 the target device (2200) may include a device interface (2210), a frame memory (2240), a decoding unit (2250) and a multimedia IP and video timing generator (2270). The device interface (2210) may send and receive compressed image data to and from host interface (2140). The device interface (2210) may store the compressed image data inputted from the host in the frame memory (2240). The frame memory (2240) may output the stored compressed image data to the decoding unit (2250).

The decoding unit (2250) may include first and second decoders (2260). The first and second decoders (2260) may input the compressed image data output from the frame memory (2240), and perform decoding of the compressed image data. And then, the first and second decoders (2260) may output decoded image data. The function and operation of decoding unit (2250) in FIG. 2 is the same as that in FIG. 1, and description thereof is thus omitted.

The image data processing system (2000) in FIG. 2 may include encoding unit (2120) in the host, and compress image data using the encoding unit (2120). The host (2100) may transmit the compressed image data to the target device (2200). According to an example embodiment, as the host (2100) transmits the compressed image data, the host (2100) may not only reduce the amount of bandwidth used between the host (2100) and the target device (2200), but also reduce the amount of the frame memory used in the target device.

II. ENCODING METHOD OF IMAGE DATA

In the following, an image data processing method of the image data processing system in FIG. 1 and/or FIG. 2 is described.

Figure 3:
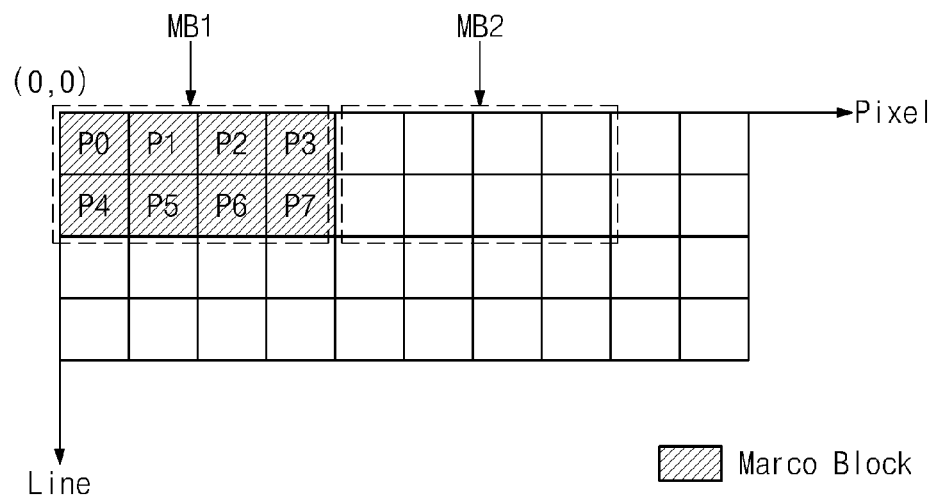
FIG. 3 is a diagram illustrating an image macro block according to at least some example embodiments of the inventive concepts.

FIG. 3 is a diagram illustrating an image macro block according to at least some example embodiments of inventive concepts. In FIG. 3, the horizontal axis is the number of pixels and the vertical axis is a line stacking pixel of the horizontal axis.

The inventive concepts may be applied to various color space such as RGB (Red Green Blue color model) or YUV (YUV color image pipeline), and bpc (bit per component) support may also be applied to all bpc in daily modern use such as 6-16 bpc. In the following, RGB 8-bpc will be described for example. RGB 8-bpc may include image data of R (Red) 8 bit, G (Green) 8 bit, B (Blue) 8 bit regarding one pixel.

Referring FIG. 3, a processing or data unit of the compressing method for image data is 4*2 block. A group of 4 horizontal pixels and 2 vertical line pixels may be defined as a 4*2 block or a macro block (MB). For example, from pixel P0 to pixel P7 may be a first macro block (MB1) and a 4*2 block adjacent to the first macro block may be a second macro block (MB2).

Figure 4:
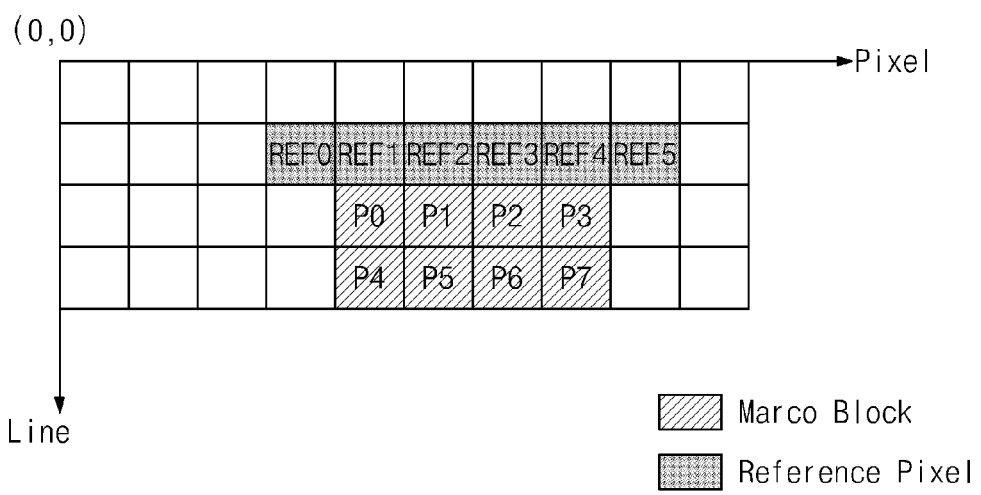
FIG. 4 is a diagram illustrating a pixel of macro block and a reference pixel according to at least some example embodiments of the inventive concepts.

FIG. 4 is a diagram illustrating a pixel of macro block and a reference pixel according to at least some embodiments of the inventive concepts. Referring to FIG. 4, when processing image data of a macro block, reference pixels are the 6 pixels located immediately above the macro block. For example, when compressing or encoding a selection macro block, the image processing system may use 6 pixels (REF0~REF5) located adjacent to the top of the macro block as reference pixels to reconstruct selection macro block pixels (P0~P7) by using the reference pixels.

Figure 5:
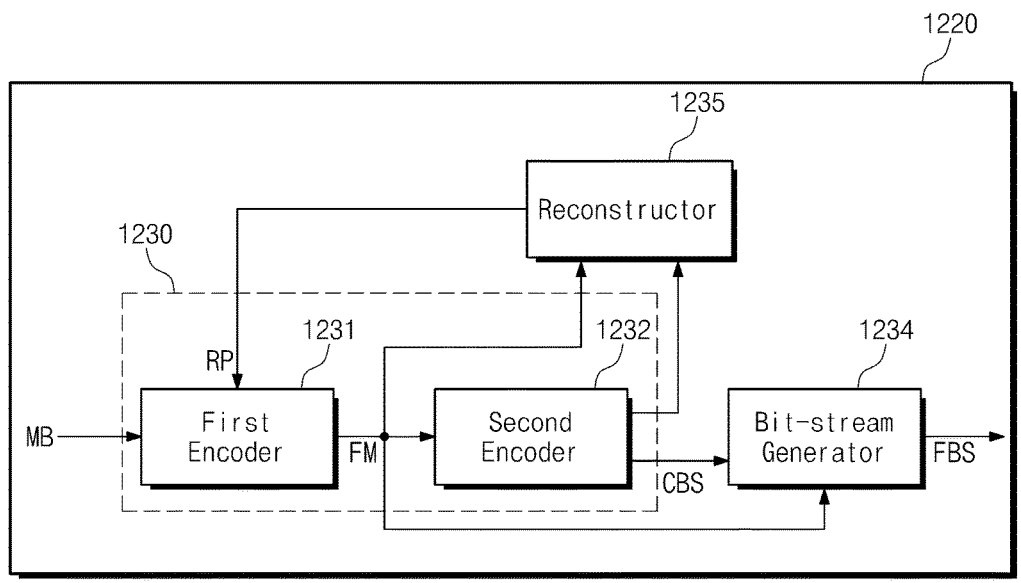
FIG. 5 is a block diagram illustrating the encoding unit of FIG. 1 according to at least some example embodiments of the inventive concepts.

FIG. 5 is a block diagram illustrating the encoding unit of FIG. 1. The encoding unit (1220) may be included in the target device (1200) in FIG. 1 or be included in the host (2100) in FIG. 2. Referring FIG. 5, the encoding unit (1220) may include an encoder unit (1230), a bit stream generator (1234), and a reconstructor (1235).

The encoder unit (1230) may include a first encoder (1231) and a second encoder (1232). Each encoder may compress only a portion of the macro block. For example, a macro block pixel compressed by the first encoder is a non-selection pixel, and a macro block pixel compressed by the second encoder is a selection pixel. The non-selection pixels compressed by first encoder (1231) may be reconstructed by using values of the reference pixels.

The first encoder (1231) may receive image data of the macro block and a first reference pixel (RP), and generate final mode information (FM). The final mode information may include mode information of the selection pixels in the macro block and reconstruction reference values (e.g., encoded values) of non-selection pixels. The encoding method of the first encoder and the method of generating the final mode information will be described in detail with respect to FIG. 6 to FIG. 9.

The second encoder (1232) may generate a compressed bit stream (CBS) based on the final mode information. The second encoder (1232) may have a low compression ratio; for example, 1/2. The method that the second encoder (1232) uses to generate the compressed bit stream will be described in detail with respect to FIG. 10.

The bit stream generator (1234) may generate a final bit stream (FBS) by using the final mode information (FM) and the compressed bit stream (CBS). The reconstructor (1235) may reconstruct second reference pixels based on the final mode information and the compressed bit stream. The second reference pixel may be used when next macro block is encoded. An operating method of the bit stream generator (1234) and the reconstructor (1235) will be described in detail with respect to FIG. 11 to FIG. 12.

Figure 6:
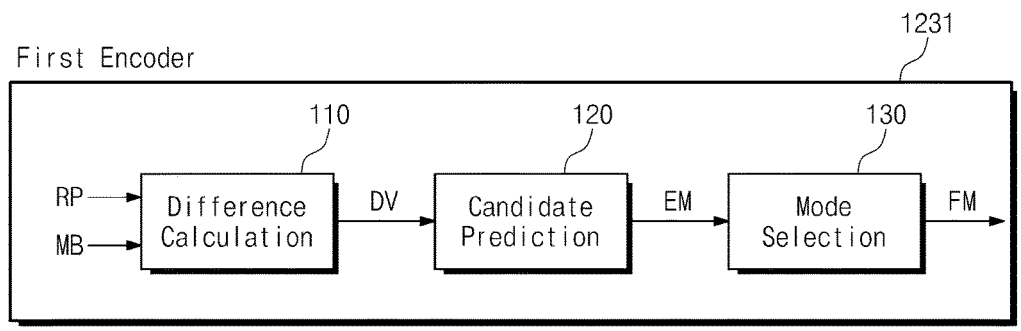
FIG. 6 is a block diagram illustrating the first encoder according to example embodiments of the inventive concepts.

FIG. 6 is a diagram illustrating the first encoder in FIG. 5 according to an example embodiment of the inventive concepts. Referring to FIG. 6, the first encoder (1231) may include a difference calculation unit (110), a candidate prediction unit (120), and a mode selection unit (130).

The difference calculation unit (110) may calculate differences based on the non-selection pixels and the reference pixels. An operation method of the difference calculation unit (110) will be described below referring to FIG. 7 and FIG. 8.

The candidate prediction unit (120) may analyze an error of each mode among the generated difference values (DV) and predict the best candidate. For this, the candidate prediction unit (120) may calculate an error of each mode (EM). The mode selection unit (130) may generate final mode information (FM) based on the error of each mode. In particular, an operation method of the mode selection unit (130) will be more fully described with reference to FIG. 9.

Figure 7:
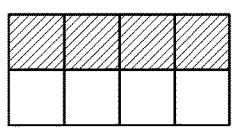
FIG. 7 is a diagram illustrating a selected pixel according to a final mode information according to example embodiments of the inventive concepts.
Figure 7:
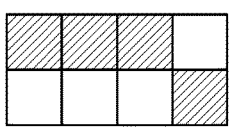
Figure 7:
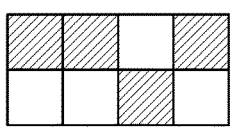
Figure 7:
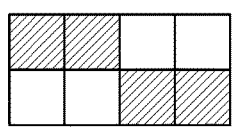
Figure 7:
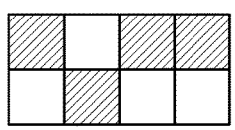
Figure 7:
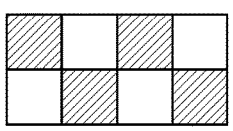
Figure 7:
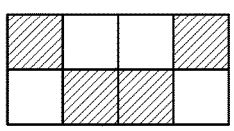
Figure 7:
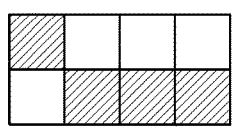
Figure 7:
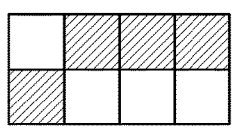
Figure 7:
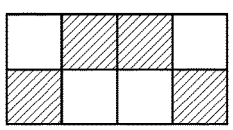
Figure 7:
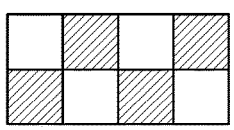
Figure 7:
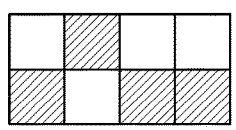
Figure 7:
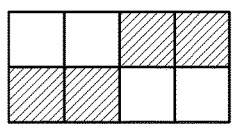
Figure 7:
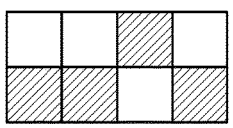
Figure 7:
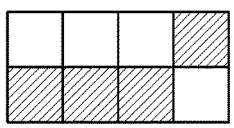
Figure 7:
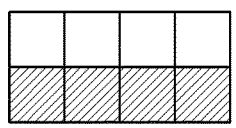

FIG. 7 is a diagram illustrating a selection pixel according to the final mode information. In FIG. 7, there is illustrated an example wherein a macro block is composed of 4*2 pixels. But it will be well understood that the number of pixels in the macro block can be determined in various other ways.

The difference calculation unit (110) may select 4 select pixels for compression by the second encoder (with reference to FIG. 5, 1232) among the 8 pixels in the macro block, and select 4 non-selection pixels for compression by the first encoder (with reference to FIG. 5, 1231) with reference to values of other pixels. The possible sets of 4 pixels compressed by the second encoder (1232) may be defined according to a total of 16 possible cases.

The 4 numbers to represent each mode of FIG. 7 means locations of 4 pixels to compress by the second encoder (1232). In each column, 0 means a pixel of upper line is selected, 1 means a pixel of lower line is selected. For example, P0, P1, P2 and P3 are selected as the 4 pixels to be compressed by the second encoder (1232) in mode 0000. The selected pixels are selection pixels. When the second encoder (1232) performs encoding regarding to the selection pixels, the second encoder encodes by compressing RGB values of the pixel. In mode 0000, the pixels of the bottom line in the macro block, which are not selected, are non-selection pixels. Non-selection pixels are encoded by the first encoder (1231). Non-selection pixels may be encoded using the values of nearby pixels or use a directional interpolation.

In mode 1111, P4, P5, P6 and P7 become selection pixels, which are compressed by the second encoder (1232), and P0, P1, P2 and P3 become non-selection pixels, which are encoded by the first encoder (1231). In mode 1110, 4 selection pixels to be compressed by the second encoder (1232) are P4, P5, P6 and P3, and 4 non-selection pixels to be encoded by the first encoder (1231) are P0, P1, P2 and P7. In the case of 1101, selection pixels are P4, P5, P2, and P7 and the non-selection pixels are P0, P1, P6 and P3.

Figure 8:
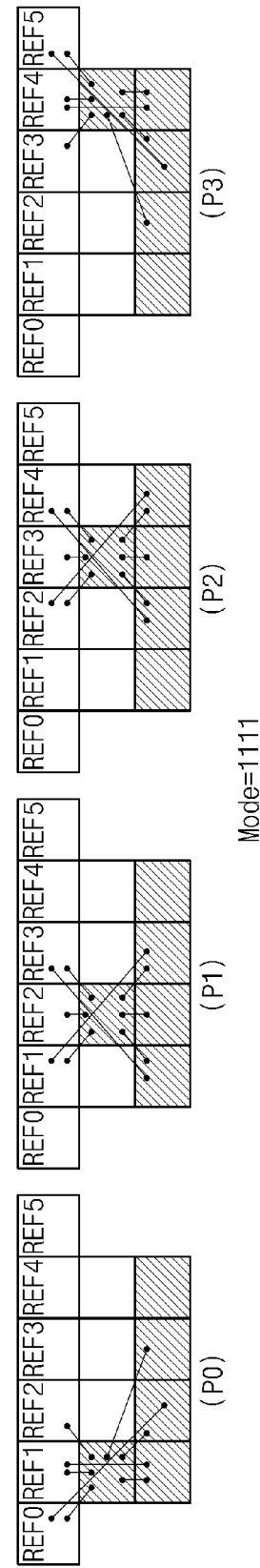
FIG. 8 is a diagram illustrating a method to calculate an optimal reconstruction reference value according to the final mode.

FIG. 8 is a diagram illustrating a method to calculate optimal reconstruction reference values according to the selection mode using first reference pixels and second reference pixels. FIG. 8 illustrates mode 1111 as an example. FIG. 8 also illustrates that the first reference pixels are based on the 6 pixels (REF0~REF5) located in the line above the top row of the macro block row. More specifically, and as will be described below, the first reference pixels are the reconstructed versions of the pixels (i.e., decoded version of the pixels after having been encoded) that are reconstructed by the reconstructor 1235. The second reference pixels are versions of the selection pixels that have been compressed by the second decoder 1232 and reconstructed (e.g., decompressed) by the reconstructor 1235.

FIG. 8 will be described assuming that the mode is '1111', the interpolation method uses an average, and the reference values are limited to 8 values. The selection pixels are P4, P5, P6 and P7 of mode 1111, and P0, P1, P2, and P3 are the non-selection pixels.

The pixel P0 of mode 1111 may refer to 8 values. The pixel P0 may refer to REF0, REF1, REF2 among the first reference pixels located above the upper row of the macro block. Also, the pixel P0 may refer to reconstructed pixels (e.g., P4', P5', P6') reconstructed after encoding by the second encoder (1232) (this will be described in detail below with respect to reconstructor 1235 and FIG. 12), and the pixel P0 may refer to an average value of REF1 and P1, and an average value of REF0 and P5'. As mentioned above, instead of an average, an interpolated value may be used.

Similarly, non-selection pixel P1 of mode '1111' may refer to 8 values. The pixel P1 may refer to REF1, REF2, REF3 among the first reference pixels located above the upper row of the macro block and reconstructed second reference pixels P4', P5', P6' after encoding by the second encoder (1232). Also, the pixel P1 may refer to an average value of REF1 and P6', and an average value of REF3 and P4'. Below, a table 1 illustrates reference values of non-selection pixels of mode 1111.

TABLE 1

| non-selection Pixels | possible reference value | | | | | | | |
|---|---|---|---|---|---|---|---|---|
| P0 | REF0 | REF1 | REF2 | P4' | P5' | P6' | (REF0 + P5')/2 | (REF1 + P4')/2 |
| P1 | REF1 | REF2 | REF3 | P4' | P5' | P6' | (REF1 + P6')/2 | (REF3 + P4')/2 |
| P2 | REF2 | REF3 | REF4 | P5' | P6' | P7' | (REF2 + P7')/2 | (REF4 + P5')/2 |
| P3 | REF3 | REF4 | REF5 | P5' | P6' | P7' | (REF4 + P7')/2 | (REF5 + P6')/2 |

As mentioned above, the difference calculation unit (in reference with FIG. 6, 110) may calculate the differential values between the non-selection pixel and the possible reference values of the non-selection pixel. The candidate prediction unit (120 in FIG. 6) determines the minimum difference value associated with each non-selection pixel, and generates an error (EM) for the mode 1111 as the sum of the minimum difference values for the four non-selection pixels. Instead of a simple sum, the error (EM) may be, for example, a sum of absolute differences (SAD), a sum of squared difference (SSD), mean absolute difference (MAD), or normalized cross correlation (NCC). In this same manner, the difference calculation unit (110) determines the difference values for the other modes, and the candidate prediction unit (120) determines the error (EM) for the other modes.

Table 2 below illustrates reference values of non-selection pixels of mode 0000.

TABLE 2

| non-selection Pixels | possible reference value | | | | | | | |
|---|---|---|---|---|---|---|---|---|
| P4 | REF0 | REF1 | REF2 | P0' | P1' | P2' | (REF1 + P0')/2 | (REF0 + P1')/2 |
| P5 | REF1 | REF2 | REF3 | P0' | P1' | P2' | (REF1 + P2')/2 | (REF3 + P0')/2 |

TABLE 2-continued

| non-selection Pixels | possible reference value | | | | | | | |
|---|---|---|---|---|---|---|---|---|
| P6 | REF2 | REF3 | REF4 | P1' | P2' | P3' | (REF2 + P3')/2 | (REF4 + P1')/2 |
| P7 | REF3 | REF4 | REF5 | P1' | P2' | P3' | (REF4 + P3')/2 | (REF5 + P2')/2 |

As will be appreciated, from Tables 1 and 2, the possible reference values for each of the other modes may be readily determined. Furthermore, for macro blocks that do not have neighboring pixels, such as macro blocks at the edges of an image, the reference pixels (e.g., REF0-REF5) may be fixed reference values (e.g., predetermined reference values). These fixed reference values may be design parameters determined through empirical study.

Figure 9:
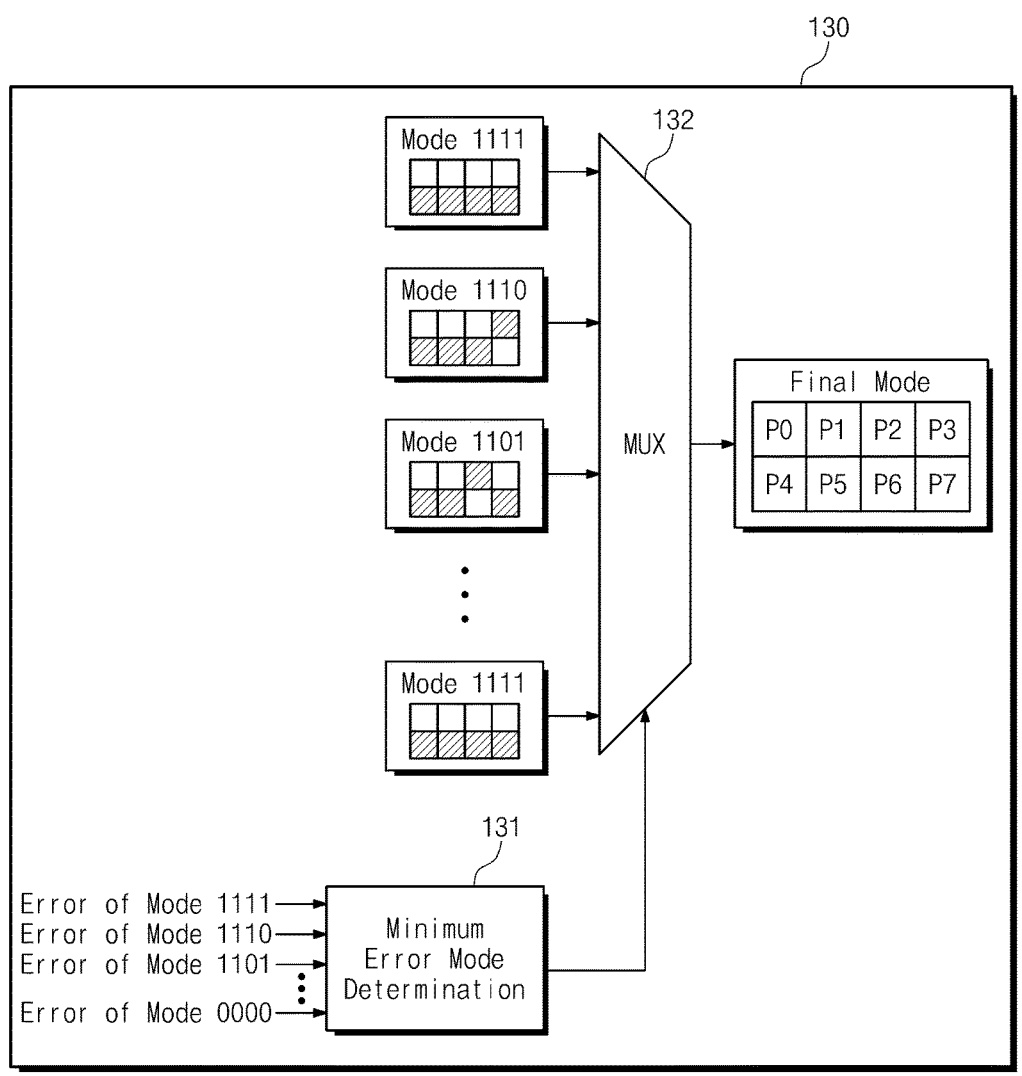
FIG. 9 is a diagram illustrating an operation of a mode selection unit according to example embodiments of the inventive concepts.

FIG. 9 is a diagram illustrating an operation and internal construction of the mode selection unit of FIG. 6 according to an example embodiment of the inventive concepts. Referring to FIG. 9, the mode selection unit (130) may include a minimum error mode determination unit (131) and a multiplexer (132).

The minimum error mode determination unit (131) may receive the error values (EM) of each mode generated by the candidate prediction unit (reference FIG. 6, 120), and determines a minimum error mode (i.e., the smallest error with random selection between ties). The minimum error mode determination unit (131) may provide a selection signal to multiplexer (132) for selecting the mode with the smallest error.

The multiplexer (132) may respond to the selection signal provided from the minimum error mode determination unit (131), and generate the final mode information. The final mode information may include mode information, which indicates the selected mode, and reconstruction reference values.

For example, assume that, the selected mode is mode '1111'. Referring to a table shown in FIG. 20, each bold-faced and italicized possible reference value represents the reference value producing the minimum difference value associated with the corresponding non-selection pixel. Each of possible reference values has a corresponding 3 bit representation. Accordingly, each of the reference values producing a minimum difference value is encoded as the corresponding 3bits. For instance, REF1 of P0 is encoded to "001", P5' of P1 is encoded to "100", (REF2+P7')/2 of P2 is encoded to "110", and REF3 of P3 is encoded to "000". When the first encoder generates the final mode information, the final mode information includes a reconstruction reference value that is used to reconstruct the non-selection pixels at the decoder. In this case, the first encoder (1231) generates the reconstruction reference value as "001 100 110 000". The reconstruction reference value represents an encoded version of the non-selection pixels. As will be discussed in more detail below, these 12 bits are sent in the 'info' portion of the final bit stream (see FIG. 11). As will be appreciated, each 3 bit segment in the 'info' portion indicates which reference value to use in reconstructing the corresponding non-selection pixel. Namely, the decoder (1250) will have knowledge of the modes and the possible reference values associated with each mode, and can perform decoding of the non-selection pixels based on the reconstruction reference value. This will be described in more detail below.

Figure 10:
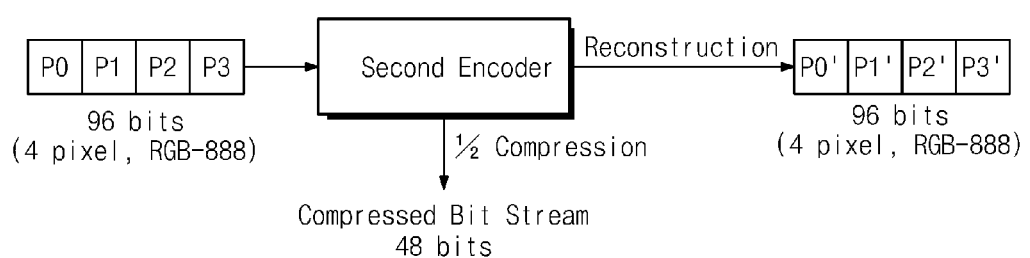
FIG. 10 is a diagram illustrating an operation of a second encoder according to example embodiments of the inventive concepts.

FIG. 10 is a diagram illustrating an operation of the second encoder in FIG. 5 according to example embodiments of the inventive concepts. Referring to FIG. 10, the second encoder (1232) may compress 4 selection pixels selected by the mode selection unit (reference FIG. 6, 130) of the first encoder (reference FIG. 5, 1231) into 1/2 quantity, and generate a compressed bit stream (CBS, reference FIG. 5)

For example, when a mode of the selection pixel of the final mode information (FM) is '0000', the second encoder (1232) compresses or encodes P0, P1, P2, and P3. Assume that each selection pixel includes 8 bit RGB information. The 4 selected pixels include the information totaling 96 bits. The second encoder (1232) compresses 96 bits pixel information into 1/2 ratio, and generates 48 bits compressed bit stream (CBS).

In FIG. 10, although the second encoder (1232) is described as 1/2 compressor, the second encoder (1232) is not limited thereto. The second encoder (1232) may reconstruct the generated compressed bit stream, and generate reconstructed pixels P0', P1', P2', and P3 of 96 bits. The reconstructed pixels may be transmitted to the reconstructor (reference FIG. 5, 1235).

As will be appreciated from the above description, the second encoder (1232) generates the compressed selection pixels for each mode so that the reconstructor (1235) may produce the second reference values (i.e., decoded selection pixels) used by the first encoder (1231) to determine the selected mode.

Figure 11:
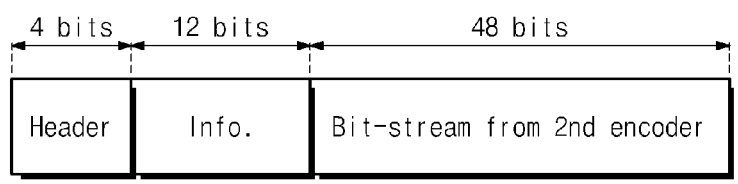
FIG. 11 is a diagram illustrating an organization of a bit stream according to example embodiments of the inventive concepts.

FIG. 11 is a diagram illustrating an operation of the bit stream generator of FIG. 5. Referring FIG. 11, the bit stream generator (1234) may generate a final bit stream by combining the compressed bit stream, the reconstruction reference value of non-selection pixels, and the mode information of the selection pixel included the final mode information.

A header of the final bit stream may represent the mode information of the selection pixels. The mode information of the selection pixels is used at decoding. The reconstruction reference value information has an information regarding which values are referenced when the non-selection pixels are decoded or reconstructed. The part except header and reconstruction reference value information of the final bit stream may include the compressed bit stream generated by the second encoder (1232). In the example of FIG. 11, there is illustrated that header is 4 bits, reference value information is 12 bits, and bit stream is 48 bits.

Figure 12:
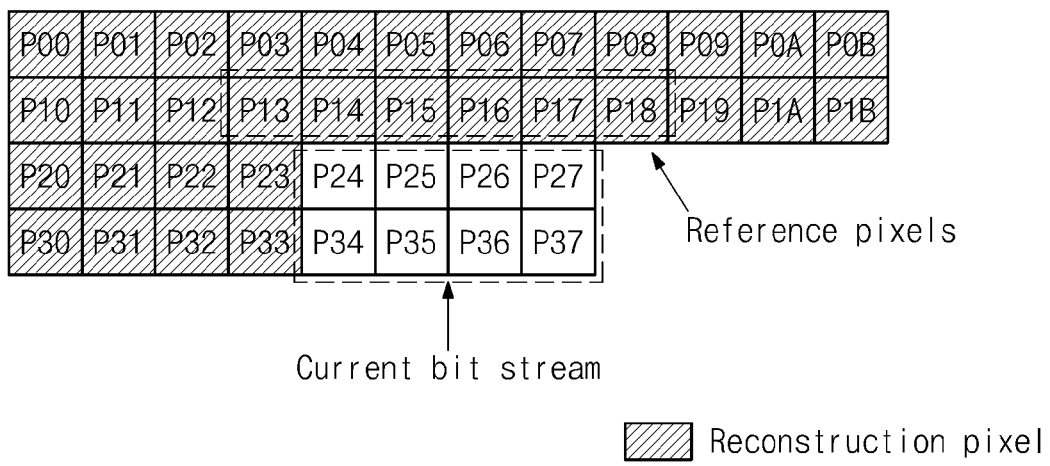
FIG. 12 is a diagram illustration an operation of reconstructor according to example embodiments of the inventive concepts.

FIG. 12 is a diagram exemplarily illustrating an operation of reconstructor of FIG. 5 Referring to FIG. 12, for encoding a macro block configured with pixel P24-27 and P34~P37, the 6 reference pixels (P13~P18) located in upper line of macro block is used.

The values of the reference pixels (P13~P18) used may not be the original pixel values but the reconstructed values. The reason for this is to create identical conditions regarding encoding or compression of the encoding unit (reference FIG. 1, 1220) and the decoding or reconstruction of decoding unit (reference FIG. 1, 1250). The decoding unit (1250) may receive the final bit stream output from the encoding unit (1220). When the decoding is performed, available data is not the original value of a pixel but the reconstruction value generated by reconstructing the compressed bit stream.

For decoding bit stream of the selection macro block (P24~P27, P34~P37) in FIG. 12, the reconstructor (1235) refers to the decoded or reconstructed values of the pixels (P13~P18) in the neighboring macro block as the first reference pixels. Namely, the values of reference pixels are a pixel values reconstructed from the final bit stream of prior macro blocks.

The encoding unit (1220) may use P13~P18 as the reference pixels to encode the selection macro block. When encoding is performed, if the encoder (1220) was to use the original value of the reference pixel, the reference pixel values used by encoding unit (1220) and the decoding unit (1250) may become different. For this reason, the values of reference pixels used are the reconstructed values. The encoding unit (1220) may store the reconstruction values and include a reconstructor (reference FIG. 5, 1235) outputting the reconstructed reference pixels RP according to the selection macro block.

Namely, as will be appreciated from the above description of the first and second encoders (1231 and 1232), the reconstructor (1235) performs the same operation as the decoding unit (1250) to decode the encoded pixels used as first and second reference values. Because the details of the decoding operation are discussed in detail below with respect to the decoding unit (1250), those details will not be repeated here for the sake of brevity.

Figure 13:
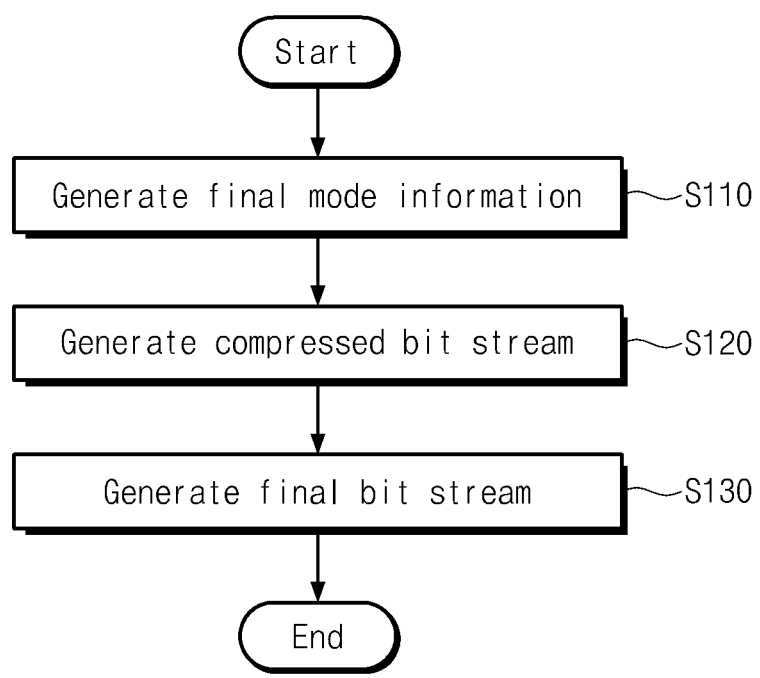
FIG. 13 is a flowchart illustrating an operation of the encoding unit according to example embodiments of the inventive concepts.

FIG. 13 is a flowchart for describing an embodiment of an operation method of the encoding unit in FIG. 5.

Referring to FIG. 13, in step S110, the first encoder of encoding unit (1220) may generate the final mode information (FM) for encoding the input macro block and the reference pixels. In step S120, the second encoder (1232) of encoding unit (1220) may generate the compressed bit stream based on the final mode information. In step S130, the bit stream generator (1234) may generate the final bit stream (FBS) by using the final mode information (FM) and the compressed bit stream (CBS).

Figure 14:
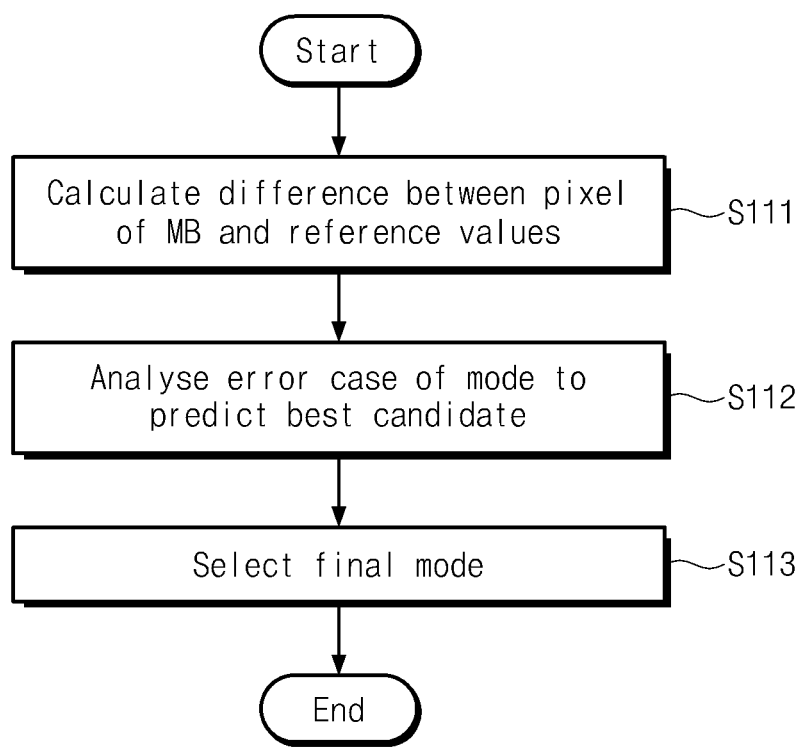
FIG. 14 is a flowchart illustrating an operation of the first encoder.

FIG. 14 is a flowchart for describing an embodiment of an operation method of the first encoder in FIG. 6.

Referring to FIG. 14, in step 111, the difference calculation unit (110) may calculate, for each mode, difference values between the non-selection pixels and the possible reference values. In step 112, the candidate prediction unit (120) determines an error for each mode from the generated difference values. In step 113, the mode selection unit (130) may generate the final mode information based on the error determined error for each mode.

III. DECODING METHOD OF IMAGE DATA

In the following, an Image data decoding method of the image data processing system in FIG. 1 and/or FIG. 2 will be described.

Figure 15:
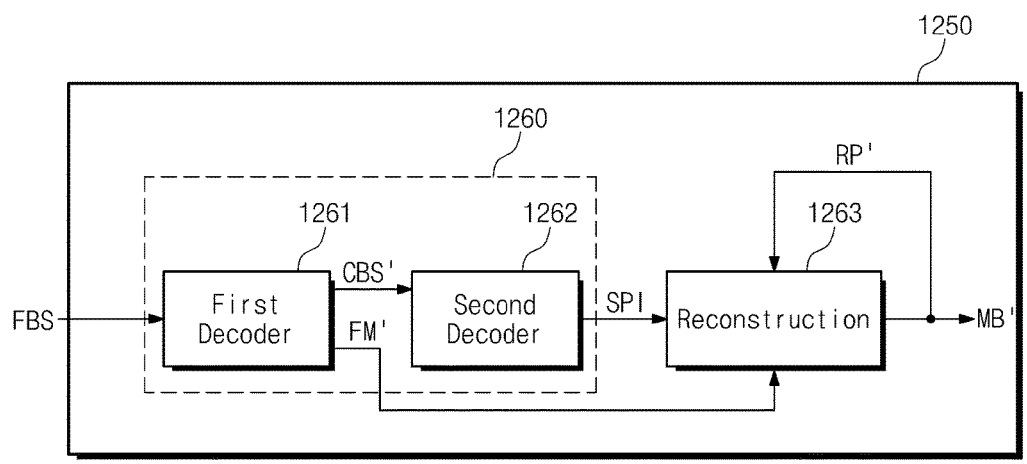
FIG. 15 is a block diagram illustrating a decoding unit.

FIG. 15 is a block diagram illustrating a decoding unit illustrated in FIG. 1 according to an example embodiment. Referring to FIG. 15, the decoding unit (1250) may include a decoder unit (1260) and a reconstruction unit (1260). The decoder unit (1260) may include a first decoder (1261) and a second decoder (1262).

The first decoder (1261) may receive the final bit stream and generate the compressed bit stream (CBS') and the final mode information (FM'). The first decoder (1261) may separate the compressed bit stream, mode information, and reconstruction reference value of the non-selection pixels based on the final bit stream. Also, the first decoder (1261) may generate a decoded final mode information (FM') based on the generated mode information and reconstruction reference value.

The second decoder (1262) may generate selection pixel information (SPI) using the compressed bit stream (CBS'). The second decoder (1262) may reconstruct a value of a selection pixel by decoding the compressed bit stream. For example, as mentioned in FIG. 10, assume that the second encoder (1232) compresses the selection pixel information from 96 bits to 48 bits by 1/2. The second decoder (1262) may reconstruct the selection pixel information of 96 bits by decoding the compressed 48 bit as 1/2. The selection pixel information (SPI) generated in second decoder (1262) may be transmitted to the reconstruction unit (1263).

The reconstruction unit (1263) may generate a decoded macro block (MB') based on the selection pixel information (SPI) and the decoded final mode information (FM'). The reconstruction unit (1263) may reconstruct the non-selection pixels from the decoded final mode information (FM'). Namely, the mode information (header) of the final mode information (FM') indicates the mode, and therefore indicates the selection pixels, the non-selection pixels and the possible reference values associated with the non-selection pixels. As will be appreciated, the decoding unit (1250) maintains the same modes as the encoding unit (1220). The reconstruction reference value in the final mode information (FM') identifies which reference value produces the minimum error with respect to each non-selection pixel. For each non-selection pixel, the reconstruction unit (1263) obtains the reference value in accordance with the mode and the previously decoded pixels, and uses that obtained reference value as the decoded (or reconstructed) non-selection pixel. The reconstruction unit (1263) may receive the selection pixel information generated by the second decoder (1262), and generate decoded macro block (MB') by combining this with the reconstructed non-selection pixels. The generated macro block may be stored at the reconstruction unit (1263) to use as reference pixel information (RP') for the next macro block.

Figure 16:
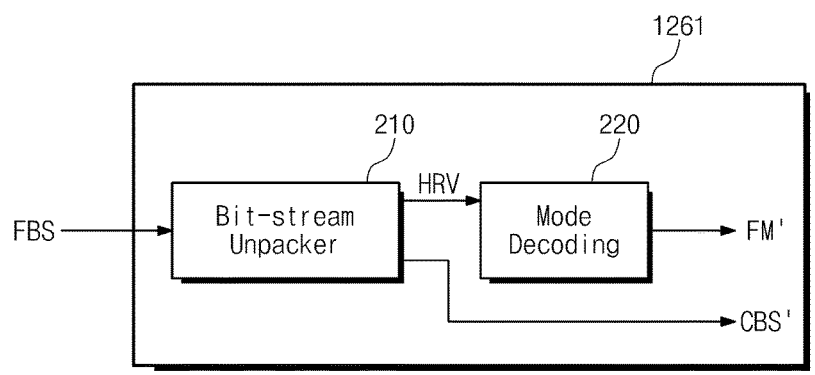
FIG. 16 is a block diagram illustrating a first decoder.

FIG. 16 is a block diagram illustrating the first decoder in FIG. 15 according to an example embodiment. Referring to FIG. 16, the first decoder (1261) may include a bit stream unpacker (210) and a mode decoding unit (220).

The bit stream unpacker (210) may separate the compressed bit stream (CBS'), header and reconstruction reference value (HRV) information from the final bit stream (FBS'). The bit stream unpacker (210) may separate the compressed bit stream (CBS') from the received final bit stream (FBS') and transmit the compressed bit stream (CBS') to the second decoder (reference FIG. 15, 1262). The bit stream unpacker (210) may transmit the header and reconstruction reference value information (HRV) excluding the compressed bit stream (CBS') to the mode decoding unit (220). The header and reconstruction reference value information (HRV) may include the mode information of selection pixel and the reconstruction reference value of the non-selection pixels.

The mode decoding unit (220) may generate the decoded final mode information (FM') based on the received header and reconstruction reference value. The decoded final mode information (FM') may include the selection pixel mode information which can be referenced when the reconstruction unit (1263) generates the decoded macro block, and the reconstruction reference value used when the non-selection pixels are reconstructed.

Figure 17:
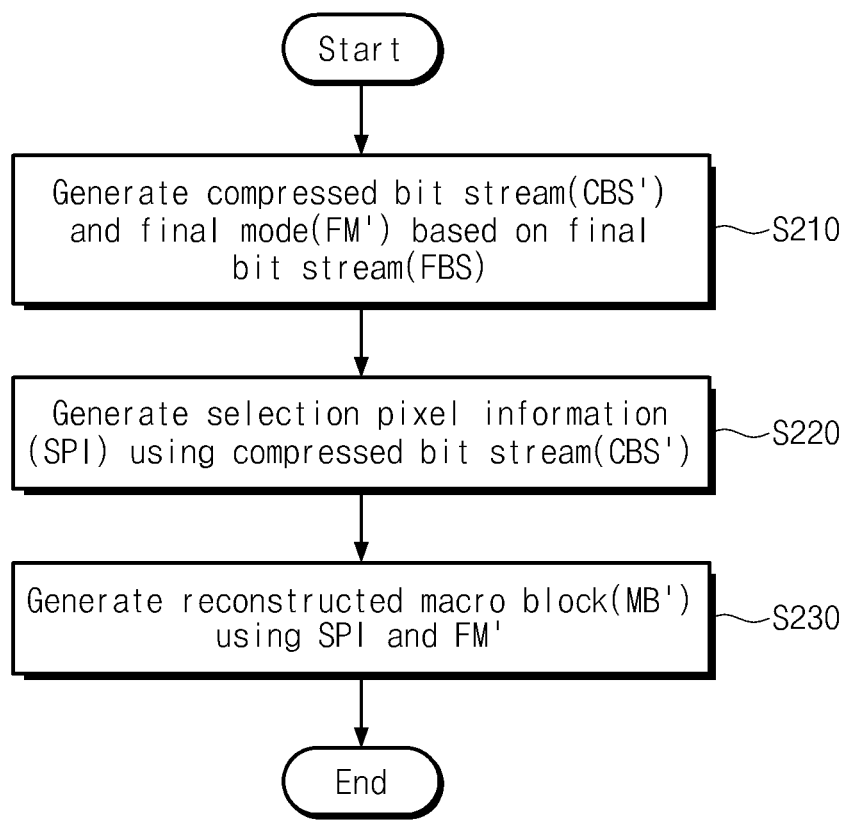
FIG. 17 is a flowchart illustrating an operation of the decoding unit.

FIG. 17 is a flowchart for describing an operation method of the decoding unit in FIG. 15. Referring to FIG. 17, in step S210, the first decoder (1261) of decoding unit (1250) may generate the compressed bit stream (CBS') and the final mode information (FM') based on the final bit stream (FBS). In step S210, the first decoder (1261) may separate the compressed bit stream (CBS') of the final bit stream (FBS), the select pixel mode information and non-select pixel reconstruction reference values. Also, the first encoder (1261) may generate the final mode information (FM') based on the generated mode information and reconstruction reference values.

In step 220, the second decoder (1262) may generate the selection pixel information (SPI) using compressed bit stream (CBS'). In other words, the second decoder (1261) may restore the selection pixel values by decoding the compressed bit stream (CBS'). As is well-known, the decoding performs the inverse of the encoding operation. The selection pixel information (SPI) generated in the second decoder (1262) may be transmitted to reconstruction unit (1263).

In step 230, the reconstruct unit (1263) may generate restored macro block (MB') based on the selection pixel information (SPI) and final mode information (FM'). The reconstruction unit (1263) may receive the selection pixel information (SPI) generated at the second decoder (1261), and generate the macro block (MB') by combining with the restored non-selection pixels. The generated macro block information may be stored in the reconstruction unit (1263) for use as reference pixel information of the next macro block.

Figure 18:
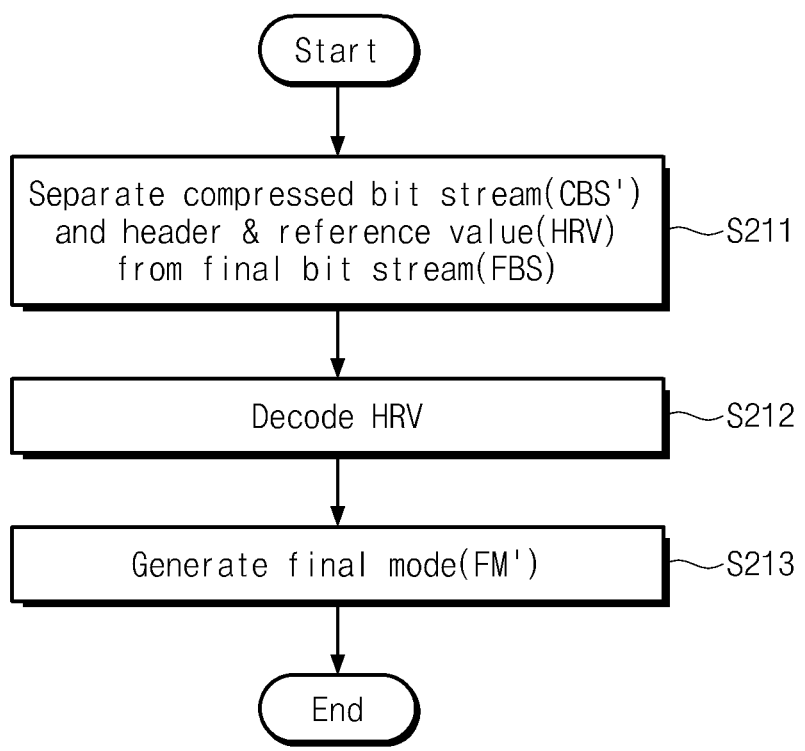
FIG. 18 is a flowchart illustrating an operation of a first decoder.

FIG. 18 is a flowchart for describing a operation method of the first decoder in FIG. 16. Referring to FIG. 16, in step S211, the bit stream unpacker (210) of first decoder (1261) may separate the compressed bit stream (CBS') and header and reconstruction reference value information (HRV) from the final bit stream (FBS). The bit stream unpacker (210) may separate the compressed bit stream (CBS') from inputted the final bit stream (FBS) and transmit the compressed bit stream (CBS') to the second decoder (1262).

In step S212, the mode decoding unit (220) may decode the header and reconstruction reference value information (HRV).

In step S213, the mode decoding unit (220) may generate the final mode information (FM') based on the decoded reconstruction reference value information. The final mode information (FM') may include the selection pixel mode information which can be referenced when the reconstruction unit (1263) generates the macro block, and the reconstruction reference value used when the non-selection pixel is restored.

IV. EXEMPLARY EMBODIMENT

Figure 19:
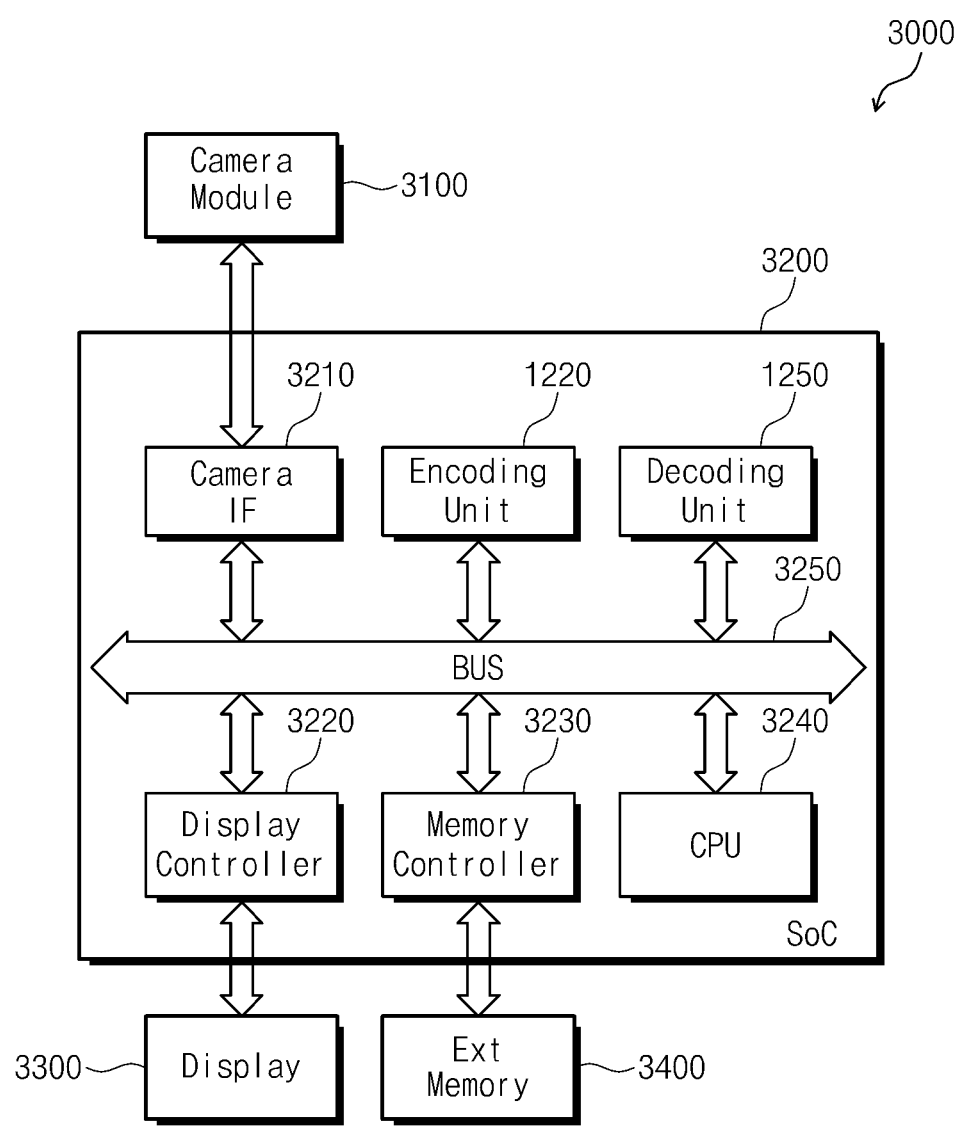
FIG. 19 is a block diagram illustrating an image data processing system according to example embodiments of the inventive concepts.

FIG. 19 is a block diagram illustrating an exemplary embodiment of system including the encoding unit and decoding unit in FIG. 1.

Referring FIG. 1 and FIG. 19, the a system (3000) may be embodied as a portable device such as a mobile phone, a smart phone, a tablet PC, a laptop computer, a personal digital assistant (PDA), an enterprise digital assistant (EDA), a digital still camera, a digital video camera, a portable multimedia player (PMP), a personal navigation device or portable navigation device (PDN), a handheld game console, a mobile internet device (MID), a wearable computer, or an e-book.

The system (3000) includes a system on chip (SoC, 3200) and an external memory (3400). According to an example embodiment, the system (3000) may further include a display (3300) or a camera module (3100).

The SoC (3200) controls an operation of an external memory (3400), the display (3300), or the camera module (3100). According to an example embodiment, the SoC (3200) may be referred to as an integrated circuit (IC), a processor, an application processor, a multimedia processor, or an integrated multimedia processor.

The SoC (3200) includes a CPU (3240), a memory controller (3230), a display controller (3220), a camera interface (3210), a encoding unit (1220), and a decoding unit (1250). Each of components 3210, 3110, 3230, 3240, 1220, and 1250 may communicate (transmit or receive data) with each other through a bus (3250). According to an example embodiment, an architecture of the bus (3250) may be various. The CPU (3240) reads and executes program commands so as to control respective components 3210, 3110, 3230, 3240, 1220, and 1250.

The memory controller (3230) may transmit the encoded bitstream output from the encoding unit (1220) to the external memory (3400) or transmit the encoded bitstream stored in the external memory (3400) to the decoding unit (1250) for a decoding.

The external memory (3400) may be a volatile memory or a non-volatile memory. The volatile memory may be a dynamic random access memory (DRAM), a static random access memory (SRAM), a thyristor RAM (T-RAM), a zero capacitor RAM (Z-RAM), or a Twin Transistor RAM (TTRAM). The non-volatile memory may be an Electrically Erasable Programmable Read-Only Memory (EEPROM), a flash memory, a Magnetic RAM (MRAM), a Phase change RAM (PRAM), or a resistive memory.

The display controller (3220) controls the display (3300) so that video data decoded by the decoding unit (1250) may be displayed on the display (3300). The display (3300) may be a liquid crystal display (LCD), a light emitting diode (LED) display, an organic light emitting diode (OLED) display, an active-matrix organic light-emitting diode (AMOLED) display, or a flexible display.

The camera module (3100) means a module which may convert an optical image into an electric image. The electric image output from the camera module (3100) may be in a RBG pixel format or a YUV pixel format. The electric image may be video source data. The electric image is transmitted to the encoding unit (1220) through the camera interface (3210) for an encoding. The encoding unit (1220) is the encoding unit (1220) illustrated in FIG. 1.

The decoding unit (1250) decodes the encoded bitstream so as to display video data on the display (3300) and outputs the video data to the display (3300).

The foregoing is illustrative of example embodiments and is not to be construed as limiting thereof. Although a few example embodiments have been described, those skilled in the art will readily appreciate that many modifications are possible in example embodiments of the inventive concepts without materially departing from the novel teachings and advantages of the inventive concepts. Accordingly, all such modifications are intended to be included within the scope of the inventive concepts as defined in the claims. Therefore, it is to be understood that the foregoing is illustrative of various example embodiments of the inventive concepts and is not to be construed as limited to the specific example embodiments disclosed, and that modifications to the disclosed example embodiments, as well as other example embodiments, are intended to be included within the scope of the appended claims.

What is claimed is:

1. A display driving device comprising:
   an encoding unit configured to,
      generate mode information based on a macro block and at least one reference pixel, the mode information indicating a selected mode from a plurality of modes, each of the plurality of modes indicating a way to divide pixels in the macro block into selection pixels and non-selection pixels, and the selected mode represented by information indicating selected locations of the selection pixels, generate a compressed bit stream of the selection pixels in the macro block based on the mode information by compressing a size of the selection pixels, generate a reconstruction reference value for each of the non-selection pixels, and generate a final bit stream including the mode information, the reconstruction reference value, and the compressed bit stream; and a frame memory configured to store the final bit stream and provide the final bit stream to a decoding unit, wherein the selection pixels are pixels in the macro block selected for undergoing a compression operation, the non-selection pixels are pixels not selected for undergoing the compression operation, and the reconstruction reference value indicates encoding information for the non-selection pixels.

2. The display driving device of claim 1, wherein the at least one reference pixel includes a first reference pixel and a second reference pixel; and the encoding unit is further configured to, generate the fit t-mode information based on the macro block, the first reference pixel, and the second reference pixel, generate the compressed bit stream based on the final-mode information, and generate the final bit stream using the mode information, the reconstruction reference value, and the compressed bit stream.

3. The display driving device of claim 2, wherein the encoding unit is further configured to reconstruct a pixel from a previous final bit stream as the first reference pixel, and reconstruct a compressed selection pixel as the second reference pixel.

4. The display driving device of claim 3, wherein the encoding unit is configured to calculate, for each of the plurality of modes, a plurality of difference values including a first difference value and a second difference value, the first difference value being a difference between one of the non-selection pixels and the first reference pixel, and the second difference value being a difference between the non-selection pixel and an average value of the first reference pixel and the second reference pixel.

5. The display driving device of claim 4, wherein the encoding unit is further configured to, determine, for each of the plurality of modes, a minimum one of the plurality of difference values associated with each of the non-selection pixels, and determine, for each of the plurality of modes, a sum of the minimum difference values as a mode error, and generate the mode information based on mode errors for the plurality of modes.

6. The display driving device of claim 5, wherein the sum is one of SAD (sum of absolute differences), SSD (sum of squared differences), MAD (mean absolute difference), or NCC (normalized cross-correlation).

7. The display driving device of claim 2, wherein the encoding unit is configured to generate the compressed bit stream by compressing the selection pixels based on the mode information.

8. The display driving device of claim 1, wherein the decoding unit is configured to, generate the compressed bit stream and decoded mode information by parsing the final bit stream, generate selection pixel information using the compressed bit stream, and generate a decoded macro block based on the selection pixel information and the decoded mode information.

9. The display driving device of claim 8, wherein the decoding unit is configured to, parse the final bit stream into the compressed bit stream, a header, and the reconstruction reference value, and generate the decoded mode information based on the header and the reconstruction reference value.

10. The display driving device of claim 9, wherein the decoding unit is further configured to reconstruct the selection pixels from the selection pixel information, and reconstruct the non-selection pixels from the mode information.

11. A host providing image compressed data to a display driving chip including a frame memory, the host comprising:

a host controller configured to transmit a control signal and un-compressed image data; and an encoding unit configured to receive the control signal and the un-compressed image data with the host controller, the encoding unit configured to, generate mode information based on a macro block and at least one reference pixel, the mode information indicating a selected mode from a plurality of modes, each of the plurality of modes indicating a way to divide pixels in the macro block into selection pixels and non-selection pixels, and the selected mode represented by information indicating selected locations of the selection pixels, generate a compressed bit stream of the selection pixels in the macro block based on the mode information by compressing a size of the selection pixels, generate a reconstruction reference value for each of the non-selection pixels, and generate a final bit stream including the mode information, the reconstruction reference value, and the compressed bit stream, wherein the selection pixels are pixels in the macro block selected for undergoing a compression operation, the non-selection pixels are pixels not selected for undergoing the compression operation, and the reconstruction reference value indicates encoding information for the non-selection pixels.

12. The host of claim 11, wherein:

the at least one reference pixel includes a first reference pixel and a second reference pixel; and the encoding unit is further configured to, generate the mode information based on the macro block, the first reference pixel, and the second reference pixel, and generate the compressed bit stream based on the mode information.

13. The host of claim 12, wherein the encoding unit is further configured to reconstruct a pixel from a previous final bit stream as the first reference pixel, and reconstruct a compressed selection pixel as the second reference pixel.

14. The host of claim 13, wherein the encoding unit is configured to calculate, for each of the plurality of modes, a plurality of difference values including a first difference value and a second difference value, the first difference value being a difference between one of the non-selection pixels and the first reference pixel, and the second difference value being a difference between the non-selection pixel and an average value of the first reference pixel and the second reference pixel.

15. The host of claim 14, wherein the encoding unit is further configured to, determine, for each of the plurality of modes, a minimum one of the plurality of difference values associated with each of the non-selection pixels, and determine, for each of the plurality of modes, a sum of the minimum difference values as a mode error, and generate the mode information based on mode errors for the plurality of modes.

16. The host of claim 15, wherein the sum is one of SAD (sum of absolute differences), SSD (sum of squared differences), MAD (mean absolute difference), or NCC (normalized cross-correlation).

17. The host of claim 11, wherein the encoding unit is configured to generate the compressed bit stream by compressing the selection pixels based on the mode information.

* * * * *